No. 623,246. Patented Apr. 18, 1899.
R. HEINLE.
EXPANSIBLE PULLEY.
(Application filed Jan. 27, 1899.)

(No Model.) 2 Sheets—Sheet 1.

Witnesses:
Chas. F. Burkhart
Henry L. Deck

Robt. Heinle
Inventor
By Wilhelm Bonner
Attorneys.

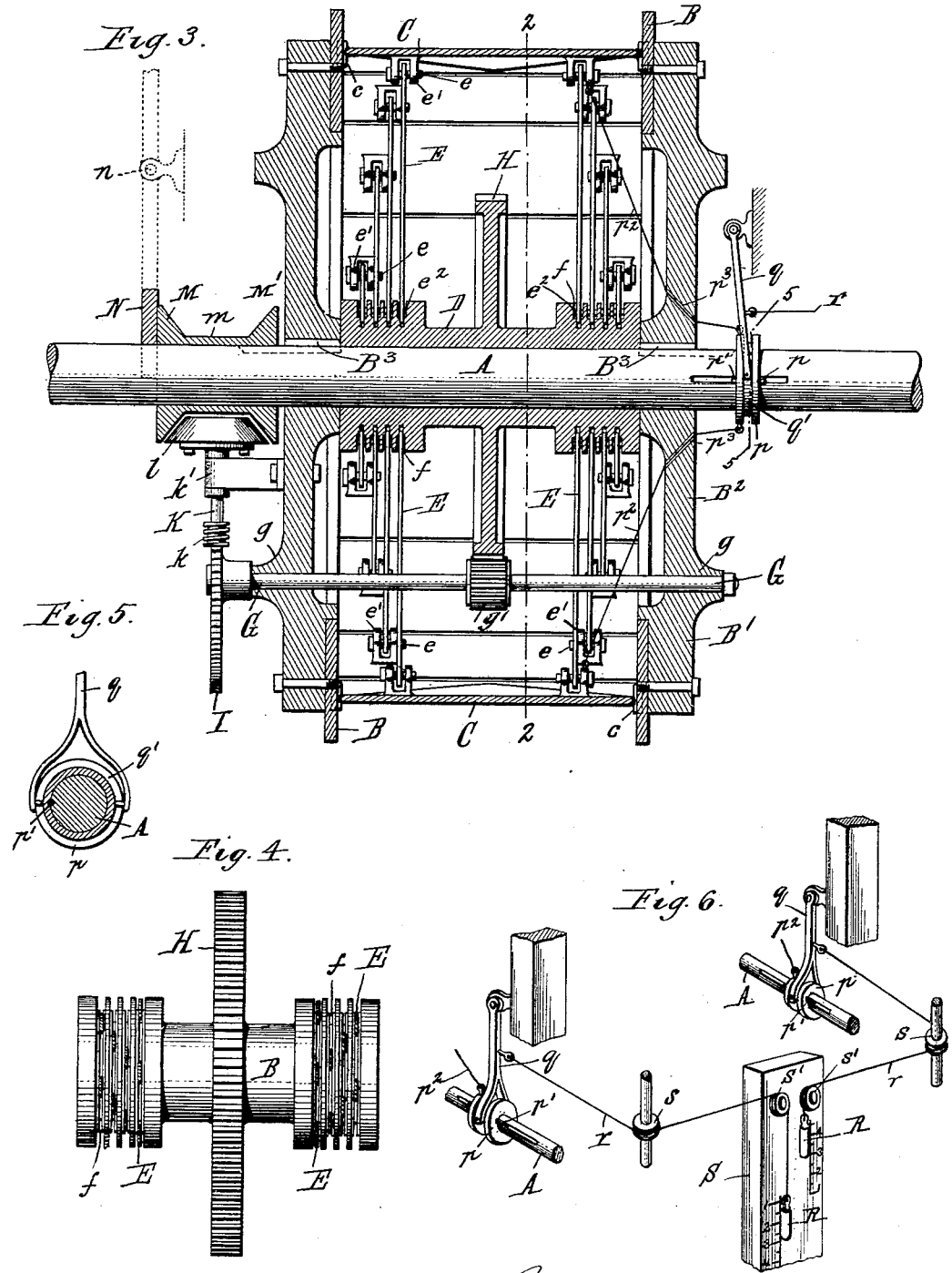

UNITED STATES PATENT OFFICE.

ROBERT HEINLE, OF LOCKPORT, NEW YORK.

EXPANSIBLE PULLEY.

SPECIFICATION forming part of Letters Patent No. 623,246, dated April 18, 1899.

Application filed January 27, 1899. Serial No. 703,549. (No model.)

*To all whom it may concern:*

Be it known that I, ROBERT HEINLE, a citizen of the United States, residing at Lockport, in the county of Niagara and State of New York, have invented new and useful Improvements in Expansible Pulleys, of which the following is a specification.

This invention relates to pulleys which are capable of being expanded or contracted diametrically and which are employed in place of the well-known reversely-arranged cone-pulleys for changing the speed of machines, such as rolling-mills or lathes. My invention has more especial reference to pulleys of this kind in which the segments forming the rim of the pulley are adjusted from a rotary sleeve by links pivoted at their outer ends to the segments and at their inner ends to the periphery of the sleeve. In order to maintain a practically circular rim or periphery in the various adjustments of such expansible pulleys, it is necessary to employ a comparatively large number of segments.

One of the objects of my invention is the construction of an efficient pulley of this character which permits a considerable range of adjustment of the segments.

The invention has the further objects to provide the pulley with simple and powerful actuating means whereby the diameter of the pulley can be readily changed and to provide a simple indicating device for indicating the relative diameters of two connected pulleys having such adjustable segments.

Figure 1:
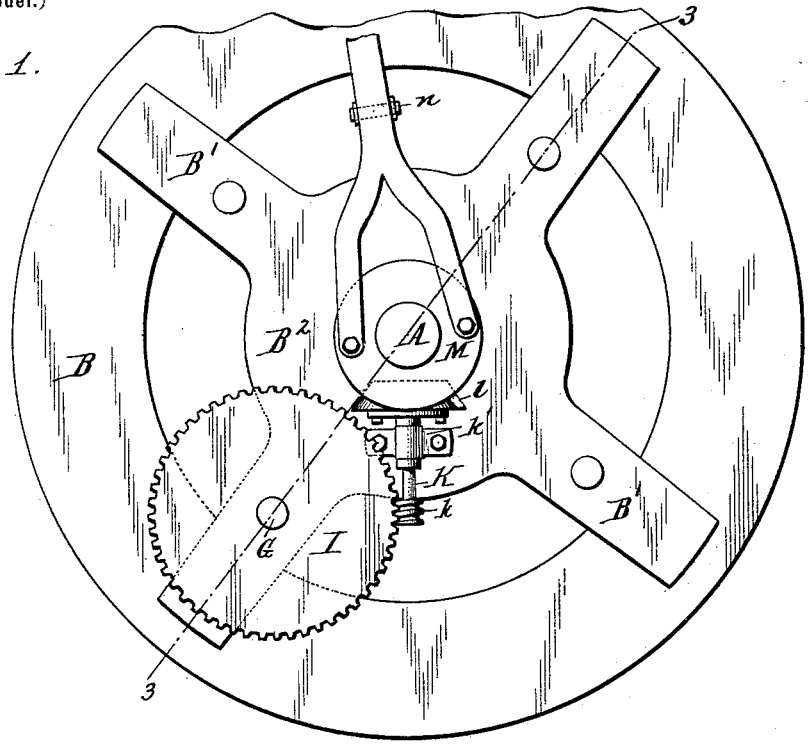
Figure 2:
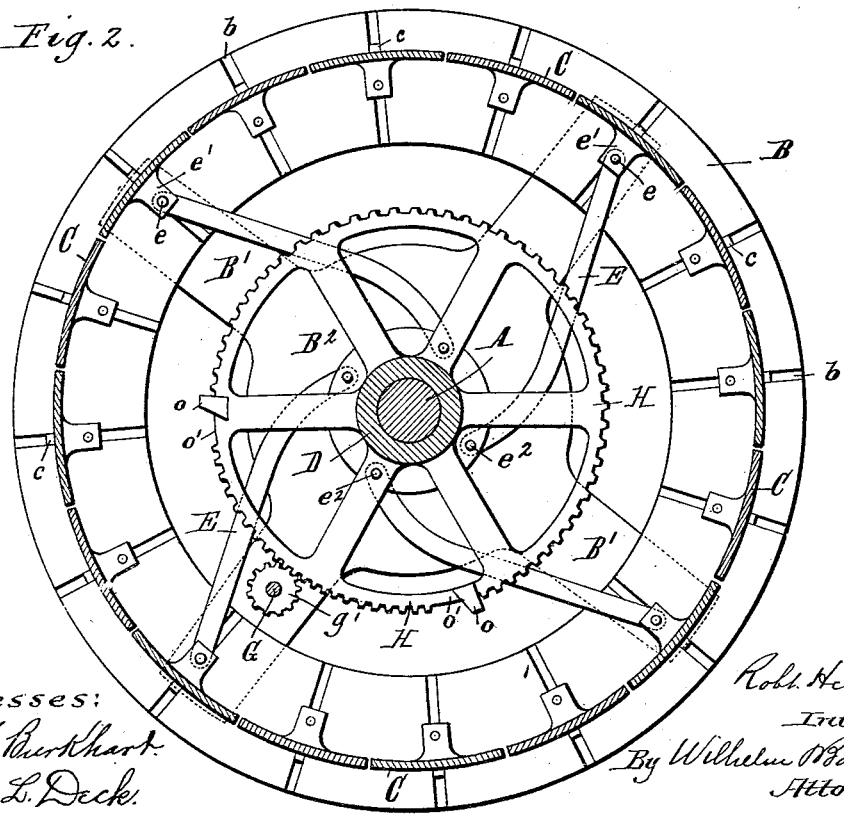

In the accompanying drawings, consisting of two sheets, Figure 1 is a fragmentary side elevation of my improved pulley. Fig. 2 is a transverse section thereof in line 2 2, Fig. 3, some of the connecting-links being omitted for clearness. Fig. 3 is a longitudinal section in line 3 3, Fig. 1. Fig. 4 is a detached plan view of the adjusting-sleeve and the connecting-links, which latter are shown in section. Fig. 5 is a cross-section in line 5 5, Fig. 3. Fig. 6 is a diagrammatic perspective view of the indicating device of two connected pulleys.

Like letters of reference refer to like parts in the several figures.

A is the shaft on which the pulley is mounted and which may be a driving-shaft or the driven shaft of a machine. The pulley consists of a pair of annular side plates or rings B, connected by arms B' with a pair of hubs $B^2$, which are rigidly secured to the shaft by keys $B^3$ or other fastenings, and radially-movable segments C, which form the cylindrical rim of the pulley. The side plates B are arranged at the proper distance apart to admit the segments between them and are provided on their inner sides with radial ways or grooves $b$, which receive guide-lugs $c$, formed at the ends of the segments.

D is a rotary adjusting hub or sleeve mounted loosely on the shaft A between the side plates B of the pulley and held against endwise movement by the same. The rim-segments are connected with this adjusting-sleeve by arms or links E, having their outer ends pivoted by transverse pins $e$ to bifurcated lugs $e'$, arranged on the inner sides of the segments and having their inner ends pivoted by similar pins $e^2$ to the sleeve, so that upon turning the sleeve in one or the other direction the links approach or recede more or less from a radial position, thereby moving the segments simultaneously outward or inward and increasing or diminishing the diameter of the pulley. The adjusting-sleeve is preferably provided with annular grooves $f$, which receive the inner ends of the links, and the pivot-pins $e^2$ pass through the walls of said grooves, as shown in Figs. 2, 3, and 4. A comparatively large number of segments are preferably employed—say sixteen, as shown in the drawings—and the faces of the segments are turned to a radius half-way between the greatest and smallest radii of the pulley, so that the periphery of the pulley does not depart materially from a true circle in any of the various adjustments of the pulley. Each segment is preferably provided with two supporting-links, arranged near opposite ends thereof. If all the links of so large a number of segments were arranged in line with each other around the adjusting-sleeve, their inner ends would be arranged so closely together that they would permit but a very small range of rotary movement of the sleeve and a correspondingly limited adjustment of the segments. In order to permit the sleeve to be turned a sufficient distance without restraint—say about a quarter-turn—the links of adjacent segments are not only arranged in advance of one another, but are progressively offset or arranged circumferentially out of line with each other, as shown in Figs. 3 and 4, whereby each link clears the links in front and in rear thereof, permitting a free rotation of the sleeve throughout the desired range of adjustment. In the construction shown in the drawings each of the enlarged end portions of the sleeve is provided with four annular grooves $f$ for receiving the inner ends of the links, and in each groove are arranged the inner ends of four links, located equidistant around the sleeve. The sleeve can therefore be given nearly a quarter-turn before being arrested by the contact of one link with the next in line therewith.

From an inspection of Figs. 3 and 4 it will be clearly understood that in a pulley having sixteen rim-segments the inner ends of the links of four successive segments are arranged in different grooves of the adjusting-sleeve and extend in an oblique line across the periphery of the sleeve and that the four pairs of such a group of links are successively arranged closer together. While I have herein shown and described a pulley with sixteen segments, it is obvious that a different number may be employed, if desired.

The sleeve D is preferably adjusted by the following mechanism:

G is a transverse actuating-shaft journaled in bearings $g$, formed in a pair of arms B' of the pulley and arranged parallel with the pulley-shaft. This shaft carries a pinion $g'$, which meshes with a gear wheel or segment H, formed on or secured to the adjusting-sleeve. One end of this shaft projects beyond the side of the pulley and carries a worm-wheel I, which meshes with a worm $k$. The latter is mounted on a radial shaft K, which is journaled in a bearing $k'$, secured to the outer side of the adjacent pulley-hub $B^2$, as shown in Figs. 1 and 3. This radial shaft is provided at its inner end with a beveled planet-gear $l$, which is adapted to engage with one or the other of two sun-gears M M', which are arranged on opposite sides of said planet-gear and are held against turning relatively thereto, so that upon bringing either of the sun-gears into mesh with said planet-gear the latter, which revolves with the pulley, is caused to turn on its axis and rotate the worm-shaft K. The sun-gears are connected by a hub or sleeve $m$ and are supported loosely on the pulley-shaft. They are free to slide lengthwise on the shaft and are shifted by a forked hand-lever N, which is pivoted at $n$ to a stationary support and has its forked ends loosely attached to the outer end of the duplex sun-gear on opposite sides of the pulley-shaft, as shown in Fig. 1. This hand-lever also serves to prevent the sun-gears from turning with the pulley-shaft.

It will now be understood that the pinion-shaft G and the worm-shaft K are carried by and rotate with the pulley, so that the planet-gear $l$ not only turns about its own axis, but also revolves around the relatively stationary sun-gears M M'. Hence by shifting one or the other of the sun-gears into engagement with the planet-gear while the pulley is in motion the planet-gear is caused to rotate in one or the other direction accordingly, and this movement of the planet-gear is transmitted, through the worm $k$, the worm-wheel I, transverse shaft G, pinion $g'$, and gear-wheel H, to the adjusting-sleeve D, thereby shifting the rim-segments of the pulley inwardly or outwardly and contracting or expanding the pulley, as hereinbefore described.

In the normal position of the adjusting devices of the pulley-segments the planet-gear $l$ is out of engagement with both sun-gears M M', allowing the adjusting devices to remain at rest.

$o$ represents a pair of stops or lugs projecting from the rim of the gear-wheel H and adapted to strike against opposite sides of the pinion $g'$ or its shrouding for properly limiting the rotation of the adjusting-sleeve D in both directions. The gear-wheel H of the adjusting-sleeve is mutilated or has a number of its teeth cut away adjacent to the front side of the stops $o$, as shown at $o'$ in Fig. 2, so that the sleeve is thrown out of gear with its actuating mechanism when carelessly turned to either extremity of its movement, preventing breakage of the parts.

In practice two of my improved pulleys are mounted on a driving-shaft and a driven shaft, respectively, and in changing the speed of the driven shaft one of the pulleys is expanded in the same measure as the other is contracted, so as to keep the driving-belt taut. In order to permit the pulleys to be accurately and readily adjusted to the proper relative diameters, each pulley is preferably provided with an indicating sleeve $p$, which is mounted on the pulley-shaft on the side of the pulley opposite that on which the sun-gears M M' are located. This sleeve is free to slide lengthwise on the pulley-shaft, but is caused to turn therewith by a key or feather $p'$, as shown in Figs. 3 and 5. The sleeve is connected with one or an opposing pair of the rim-segments C by wires or flexible connections $p^2$, which extend inwardly from such segments and pass through oblique openings $p^3$, formed in the hubs of the pulley, so that when the segments are expanded the indicating-sleeve is drawn toward the pulley. When the segments are contracted, the sleeve is moved outwardly by an arm $q$, pivoted to swing lengthwise on the pulley-shaft and engaging with its forked lower end in an annular groove $q'$, formed in the periphery of the sleeve, and a depending weight R, connected with said arm by a cord or wire $r$, running over suitably-arranged guide-pulleys. In the construction shown in Fig. 6 of the drawings the cords connected with the shifting arms $q$ of the driving and driven pulleys extend outwardly from the sleeves parallel with the pulley-shafts and pass around horizontal guide-wheels s, and thence toward each other and over a pair of upright guide-wheels s', journaled on a post or upright S, so that the end portions of the cords which carry the weights R are arranged side by side. When the relative diameters of the two connected pulleys are changed, the sleeves p of the two pulleys are shifted in reverse directions, causing the weight connected with the inwardly-moving sleeve to ascend and the weight connected with the outwardly-moving sleeve to descend, and when the pulleys are equally adjusted the two weights traverse uniform distances, thus serving as indicators for determining the proper relative adjustment of the two pulleys. To enable the relative positions of the indicating-weights to be readily determined, the post S may be provided opposite the weights R with two vertical scales or rows of similar graduations running from a central point in opposite directions, as shown, or arranged in any other suitable manner. Any other suitable indicating device may be employed in connection with the sleeves p, if desired. When the gear-wheel H of either of the connected pulleys is thrown out of gear with the pinion g' by the excessive turning of said wheel, the parts are again brought into gear with each other by contracting the other pulley to slacken the belt and then turning the gear-wheel H into engagement with the pinion g'.

My improved construction not only permits the use of a large number of rim-segments and affords a considerable range of adjustment of the pulley, but provides efficient adjusting mechanism, which combines great power with simplicity of construction.

I prefer to employ frictional gearing for turning the pinion-shaft G, as shown; but toothed gearing may be employed, if desired.

I claim as my invention—

1. The combination with the body of the pulley and the rim-segments guided radially thereon, of an axial adjusting-sleeve, and links connecting the segments with said sleeve, the links of adjacent segments being offset or arranged out of line circumferentially of said sleeve, substantially as set forth.

2. The combination with the body of the pulley and the rim-segments guided radially thereon, of an axial adjusting-sleeve having a number of transverse grooves arranged side by side, and links connecting said segments with said sleeve, and having their inner ends pivoted in the grooves of the sleeve, the links of adjacent segments being located in different grooves of the sleeve to clear each other, substantially as set forth.

3. The combination with the body of the pulley and the radially-movable segments guided thereon, of an axial adjusting-sleeve, connections which transmit the movement of said sleeve to the rim-segments, an actuating-shaft journaled on the body of the pulley and arranged parallel with the axis thereof, gearing connecting the adjusting-sleeve with said shaft, and means for turning said shaft, substantially as set forth.

4. The combination with the body of the pulley and the radially-movable segments guided thereon, of an axial adjusting-sleeve, connections which transmit the movement of said sleeve to the rim-segments, an actuating-shaft journaled on the body of the pulley and arranged parallel with the axis thereof, gearing connecting the adjusting-sleeve with said shaft, a radial shaft also journaled on the body of the pulley and provided with a planet-gear, gearing connecting said actuating-shaft with said radial shaft, and movable sun-gears arranged on opposite sides of said planet-gear, substantially as set forth.

5. The combination with the body of the pulley and the radially-movable segments guided thereon, of an axial adjusting-sleeve, connections which transmit the movement of said sleeve to the rim-segments, an actuating-shaft journaled on the body of the pulley and arranged parallel with the axis thereof, gearing connecting the adjusting-sleeve with said shaft, a radial shaft journaled on one of the side plates of the pulley and provided at its inner end with a planet-gear and at its outer end with a worm which meshes with a worm-wheel mounted on said actuating-shaft, and sun-gears mounted on the pulley-shaft on opposite sides of said planet-gear and capable of sliding lengthwise on the shaft, substantially as set forth.

6. The combination with the body of the pulley and the radially-movable segments guided thereon, of an axial adjusting-sleeve having a gear-wheel provided with stops, connections extending from the segments to said sleeve, and an actuating-shaft journaled on the body of the pulley and having a pinion which meshes with said gear-wheel and against which said stops are adapted to engage, substantially as set forth.

7. The combination with a pulley having radially-movable rim-segments, of an indicator-sleeve arranged to slide toward and from the side of the pulleys, a connection extending from said sleeve to one of said segments for causing the sleeve to move with said segment in one direction, and means for shifting said sleeve in the opposite direction, substantially as set forth.

8. The combination with a shaft and a pulley mounted thereon and having radially-movable rim-segments, of a grooved indicator-sleeve capable of sliding on said shaft but compelled to turn therewith, a connection extending from said sleeve to one of the rim-segments, a shifting lever engaging in a groove in said sleeve, and a weight connected with said lever, substantially as set forth.

9. The combination with a pulley having radially-movable rim-segments, of an indicator-sleeve arranged to slide toward and from the side of the pulley, a connection extending from said sleeve to one of said segments for causing the sleeve to move with said segment in one direction, a post or upright having a guide-wheel, an indicating-weight arranged to traverse said post, and a cord or wire connecting said weight with said sleeve and running over said guide-wheel, substantially as set forth.

Witness my hand this 10th day of January, 1899.

ROBERT HEINLE.

Witnesses:
CARL F. GEYER,
JNO. J. BONNER.